(12) United States Patent
Futami

(10) Patent No.: US 8,565,613 B2
(45) Date of Patent: Oct. 22, 2013

(54) WAVELENGTH CONVERSION APPARATUS, WAVELENGTH CONVERSION METHOD, AND OPTICAL ADD/DROP MULTIPLEXER USING THE SAME

(75) Inventor: Fumio Futami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 13/110,540

(22) Filed: May 18, 2011

(65) Prior Publication Data

US 2011/0293273 A1    Dec. 1, 2011

(30) Foreign Application Priority Data

May 31, 2010  (JP) .................................. 2010-125145

(51) Int. Cl.
*H04B 10/00*  (2013.01)
*G02B 6/00*  (2006.01)

(52) U.S. Cl.
USPC ............ 398/177; 398/179; 398/173; 385/122

(58) Field of Classification Search
USPC ........... 398/43–103, 129, 146, 173, 177, 179; 385/122, 15; 372/21; 359/341.31, 327
See application file for complete search history.

(56) References Cited

U.S. PATENT DOCUMENTS

| | | | | |
|---|---|---|---|---|
| 6,618,531 | B1 * | 9/2003 | Goto et al. ..................... | 385/122 |
| 2001/0021288 | A1 * | 9/2001 | Watanabe et al. ............... | 385/15 |
| 2003/0231885 | A1 * | 12/2003 | Kato et al. ...................... | 398/98 |
| 2005/0111499 | A1 * | 5/2005 | Tanaka ........................... | 372/21 |
| 2006/0204170 | A1 * | 9/2006 | Igarashi et al. ................. | 385/24 |
| 2008/0013163 | A1 * | 1/2008 | Leonardo et al. ......... | 359/341.31 |
| 2009/0213880 | A1 * | 8/2009 | Ouchi et al. .................... | 372/21 |
| 2010/0142959 | A1 * | 6/2010 | Futami et al. .................. | 398/79 |

FOREIGN PATENT DOCUMENTS

| | | |
|---|---|---|
| EP | 1118904 A1 | 7/2001 |
| JP | 2004-163558 A | 6/2004 |
| WO | WO-02/11332 A2 | 2/2002 |

OTHER PUBLICATIONS

Extended European Search Report dated Sep. 7, 2011 for corresponding European Application No. 11167632.6.
Agrawal, G. P. et al., "Nonlinear Fiber Optics", Fourth Edition, Chapter 10, and Section 12.2 in Chapter 12, Academic Press, 2007, pp. 368-423, and pp. 464-469.
Nishizawa, N. et al., "Analysis of Widely Wavelength Tunable Femtosecond Soliton Pulse Generation Using Optical Fibers", Jpn. J. Appl. Phys., vol. 38, Aug. 1999, pp. 4768-4771.

* cited by examiner

*Primary Examiner* — Ken Vanderpuye
*Assistant Examiner* — Dibson Sanchez
(74) *Attorney, Agent, or Firm* — Fujitsu Patent Center

(57) ABSTRACT

There is provides a wavelength conversion apparatus for converting a wavelength of input signal light and for outputting output signal light of the converted wavelength. The apparatus includes a first and a second nonlinear mediums. The first nonlinear medium receives a first input light and outputs a first output light having a wavelength which is longer than that of the first input light, the wavelength being dependent on optical power of the first input light. The second nonlinear medium receives a second input light and a light output by a light source and outputs a second output light having a wavelength dependent on the wavelengths of the second input light and the light. The first output light is input as the second input light to the second nonlinear medium or the second output light is input as the first input light to the first nonlinear medium.

12 Claims, 14 Drawing Sheets

WAVELENGTH CONVERSION APPARATUS, WAVELENGTH CONVERSION METHOD, AND OPTICAL ADD/DROP MULTIPLEXER USING THE SAME

CROSS-REFERENCE TO RELATED APPLICATION

This application is based upon and claims the benefit of priority of the prior Japanese Patent Application No. 2010-125145, filed on May 31, 2010, the entire contents of which are incorporated herein by reference.

FIELD

The embodiments discussed herein are related to a wavelength conversion apparatus, a method of converting a wavelength, and an optical add/drop multiplexer that convert a wavelength of input signal light into a desired wavelength of output signal light.

BACKGROUND

Wavelength conversion technology that converts wavelengths of signal light is used, for example, to effectively design and operate photonic networks. Photonic networks utilize widely used wavelength division multiplexing and use optical fiber transmission lines as signal light transmission lines. The wavelength conversion technology desirably features an independent property from modulation formats so as to operate for signals of a variety of modulation formats independently of signal light modulation formats. It is also desirable that the wavelength conversion technology feature a wavelength conversion property that enables conversion of a wavelength into a desired wavelength and ultra high-speed response characteristics for handling high-speed signals.

In general, wavelength conversion of signal light is achieved by converting signal light into an electric signal with an optical receiver and modulating output light of a laser diode (LD), which outputs light at different wavelengths, with the converted electric signal. This method enables integration of electronic circuits, and may convert a wavelength into a desired wavelength if the LD that outputs light at the desirable wavelength is provided. However, with the wavelength conversion method of signal light using electronic circuitry, since the electronic circuitry depends on signal light modulation formats, it is difficult for a single electric circuit to deal with signals of various modulations. There is also a problem with high-speed response characteristics because of limitation on the operating speed of the electronic circuitry.

With the signal light wavelength conversion method that keeps signal light in the form of light without using electronic circuitry, the limitation on the operating speed of electronic circuitry is avoidable. Thus, the ultra high-speed response characteristics are achieved, and the dependency on modulation formats may be eliminated because of preserving the optical electric field in this method. In addition, a process of converting a signal light wavelength that keeps signal light in the form of light without using electronic circuitry may consume less electricity than a process of converting signal light wavelengths using electronic circuitry. For these reasons, there are growing expectations for a practically usable signal light wavelength conversion method that keeps signal light in the form of light without using electronic circuitry. The method has been widely researched and developed, and a variety of techniques has been proposed thus far.

FIG. 1 illustrates a wavelength conversion method using a four-wave mixing (FWM) effect that is produced in an optical nonlinear medium. The wavelength conversion method using the FWM effect is one of conversion methods that keep signal light in the form of light.

When pump light enters the optical nonlinear medium together with signal light, a copy of the signal light, referred to as idler light, is generated at a newly generated different wavelength $\lambda_{out}$ by the nonlinear effect under a condition described later. The wavelength of the signal light is converted by extracting the idler light with an optical filter. Since the idler light generated is phase conjugate light of the signal light, the optical electric field intensity and the phase are preserved through the FWM effect. For this reason, a wavelength conversion method using the FWM effect is able to convert a wavelength of signal light of any modulation format without losing information. In addition, since the FWM effect is a nonlinear effect that responds in the femtosecond order, an ultra high-speed response is achievable. However, in order to efficiently produce the FWM effect, there is a condition that the wavelength of the pump light ($\lambda$p) matches the zero dispersion wavelength inherent to the nonlinear medium. Under this condition, the wavelength of the newly generated light ($\lambda$out) satisfies the following equation.

$$\frac{1}{\lambda_{out}} = \frac{2}{\lambda_p} - \frac{1}{\lambda_{in}}, \tag{1}$$

where $\lambda_{out}$, $\lambda_p$, and $\lambda_{in}$ represent the wavelength of the idler light, pump light, and the input signal light, respectively.

Since the wavelength $\lambda$p of the pump light is fixed, it is impossible to convert the wavelength $\lambda$in of the input signal light into a desired wavelength of the output signal light with the wavelength conversion method illustrated in FIG. 1, as seen in the above equation (1).

FIG. 2 illustrates a wavelength conversion method using a self-frequency shift effect. The wavelength conversion method using the self-frequency shift effect is one of conversion methods that keep signal light in the form of light. The self-frequency shift effect is one of optical nonlinear effects.

The wavelength conversion method using the self-frequency shift effect utilizes the following phenomenon in which, when the signal light enters an optical nonlinear medium, the signal light itself functions as the pump light and the wavelength (frequency) of the signal light is shifted to a longer wavelength (lower frequency) by the Raman effect. A wavelength shift amount depends on optical power of the signal light input to the nonlinear medium. Thus, as illustrated in FIG. 2, the wavelength shift amount is adjustable by adjusting the power of the signal light input to the nonlinear medium with an optical amplifier, an optical attenuator, or the like.

In addition, since the wavelength conversion using the self-frequency shift effect utilizes a gain produced by the Raman effect, the optical electric field intensity and the phase are preserved. Since the Raman effect features a very high-speed response, this wavelength conversion is operable at a speed far higher than that of the operation of electronic circuitry. However, since the gain derived from the Raman effect is produced only on the long wavelength side of the signal light, the wavelength conversion using the self-frequency shift effect is unable to convert a wavelength into a wavelength on the short wavelength side.

Technology of four wave mixing is disclosed, for example, in Japanese Laid-open Patent Publication No. 2004-163558, and in "Nonlinear Fiber Optics"; Fourth ed., Govind P. Agrawal, Academic Press, 2007. A wavelength conversion technology using the self-frequency shift effect is disclosed, for example, in "Analysis of Widely Wavelength Tunable Femtosecond Soliton Pulse Generation Using Optical Fibers," Nishizawa Norihiko, Okamura Ryuji and Goto Toshio, *Japanese Journal of Applied Physics*, Vol. 38, pp. 4768-4771, Part 1, No. 8, August, 1999.

SUMMARY

According to an aspect of the invention, a wavelength conversion apparatus is for converting a wavelength of input signal light and for outputting output signal light of the converted wavelength and includes a first nonlinear medium that receives a first input light and outputs a first output light having a wavelength which is longer than that of the first input light, the wavelength being dependent on optical power of the first input light, and a second nonlinear medium that receives a second input light and a light output by a light source and outputs a second output light having a wavelength dependent on the wavelengths of the second input light and the light, wherein the first output light is input as the second input light to the second nonlinear medium or the second output light is input as the first input light to the first nonlinear medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In order to efficiently use photonic networks, it is desirable for a practically usable wavelength conversion technology to process a signal light transmitted faster than electronic circuitry operates. Further, the wavelength conversion technology is desirable to operate independently of signal modulation formats and to convert a certain wavelength of signal light into a desired wavelength of signal light. Related art technology that achieves wavelength conversion of signal light while keeping signal light in the form of light as described above is operable with signal light transmitted at a bit rate higher than that of the operation of electronic circuitry and is capable of being performed independently of signal modulation formats. However, the related art technology is difficult to convert a certain wavelength of the signal light into a desired wavelength.

Embodiments according to the present invention are directed to a wavelength conversion apparatus, a method of converting a wavelength, and an optical add/drop multiplexer that convert a wavelength of input signal light into a desired wavelength of output signal light. The embodiments will be described below with reference to the drawings, and configurations according to the embodiments are exemplary, and configurations are not limited the configurations according to the embodiments disclosed herein.

A wavelength conversion apparatus in each embodiment is operable as a light transmitter-receiver that transmits and receives signal light.

First Embodiment

A wavelength conversion apparatus of a first embodiment converts a wavelength $\lambda in$ of input signal light into a desired wavelength $\lambda out$ of output signal light and outputs resultant signal light.

Figure 1:
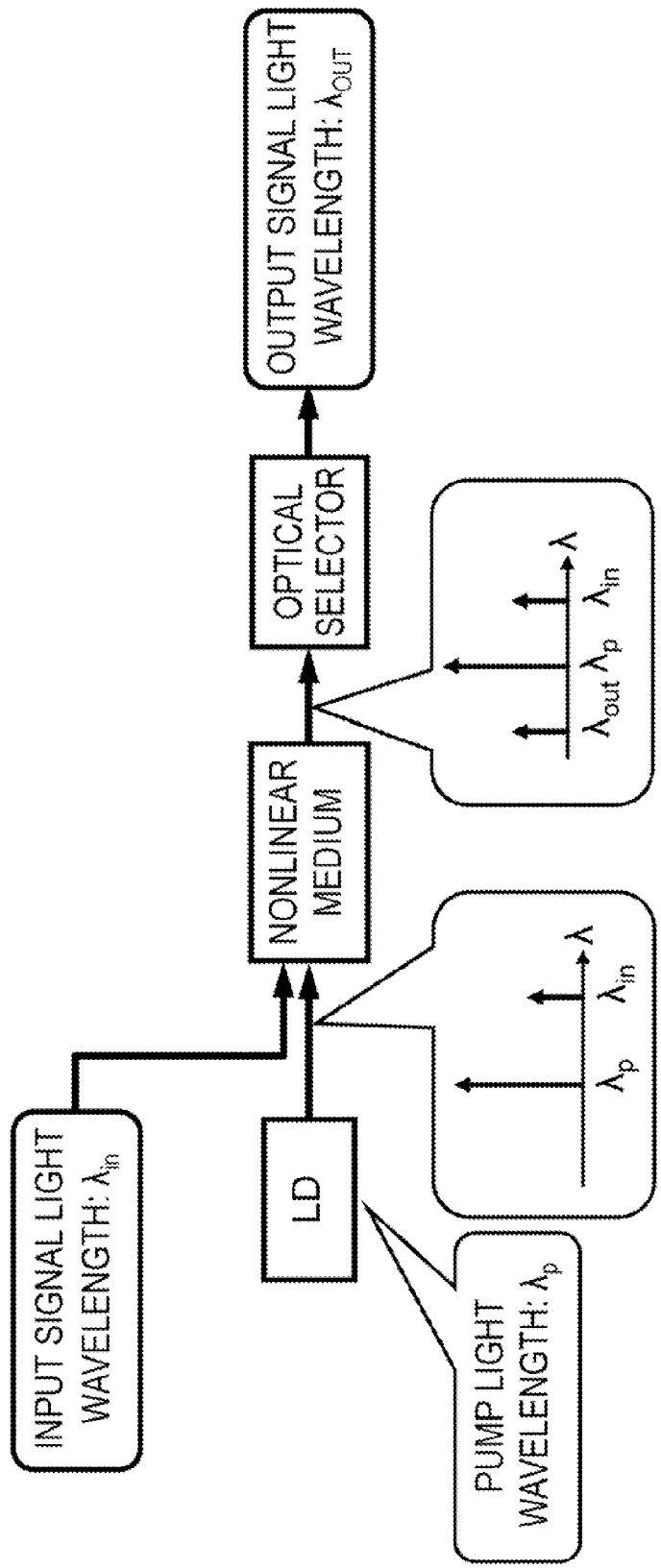
FIG. 1 illustrates a method of converting a wavelength using a four-wave mixing effect.
Figure 2:
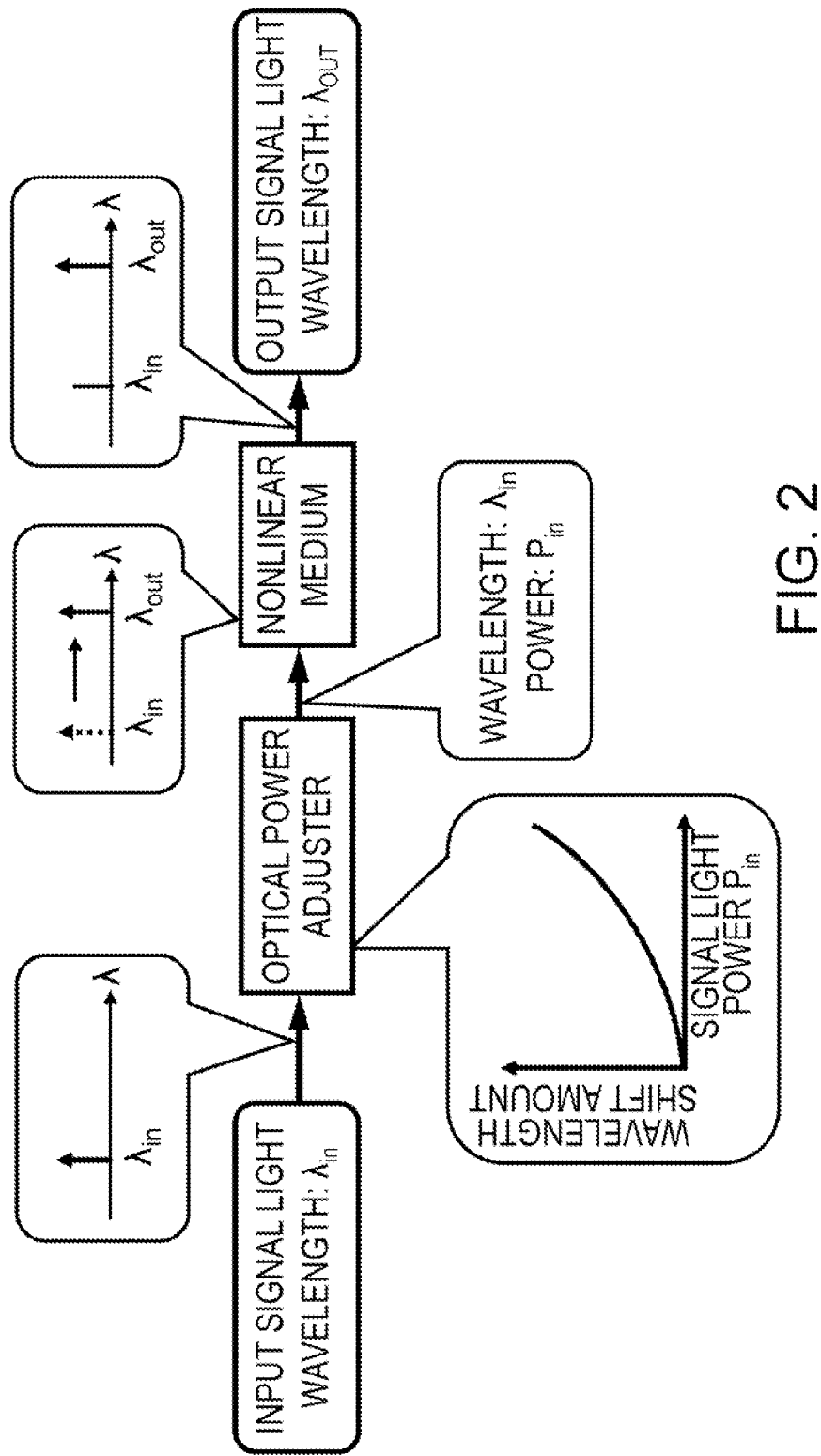
FIG. 2 illustrates a method of converting a wavelength using a self-frequency shift effect.
Figure 3:
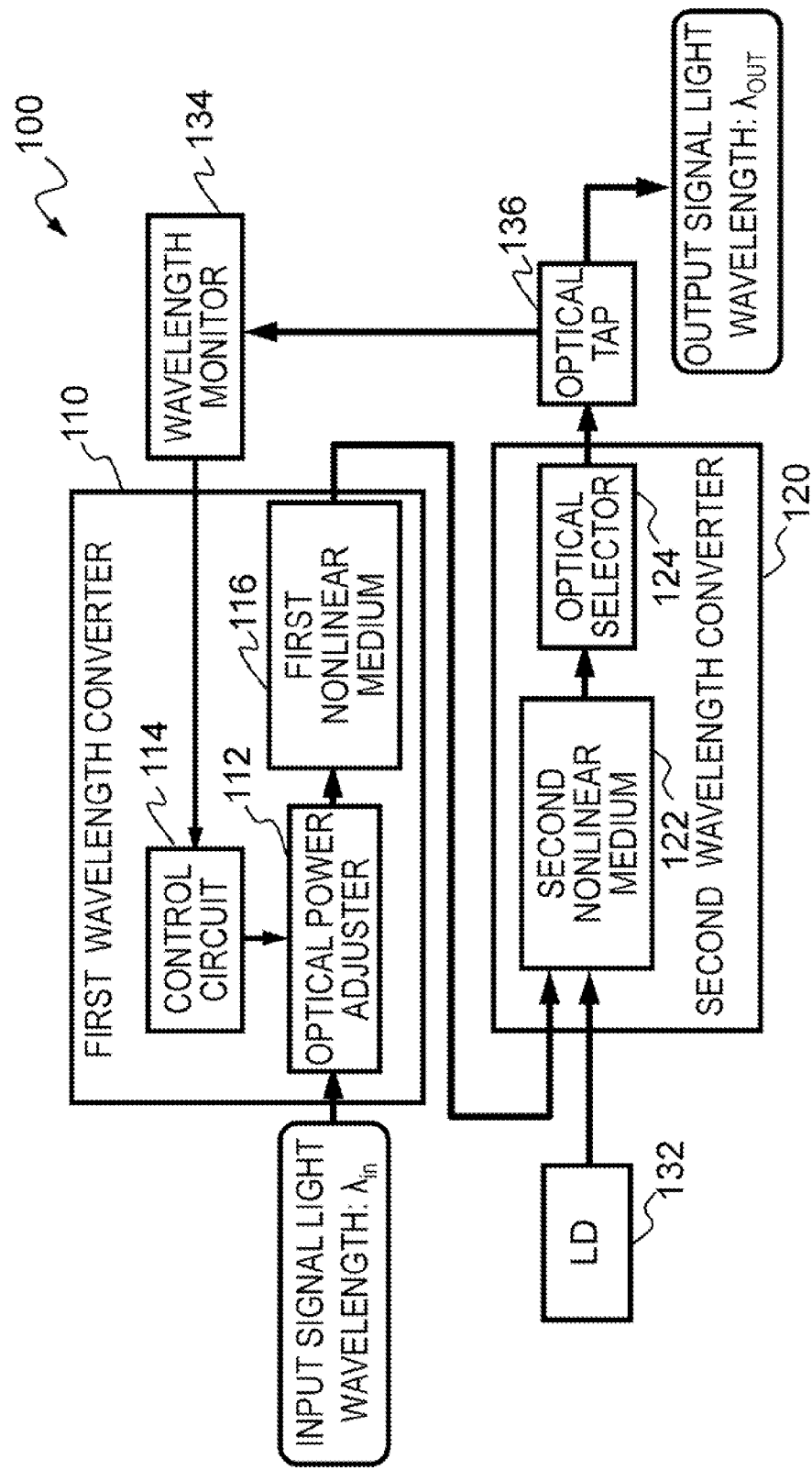
FIG. 3 is an example of a configuration of a wavelength conversion apparatus of a first embodiment.

FIG. 3 illustrates an example of a wavelength conversion apparatus of the first embodiment. A wavelength conversion apparatus 100 illustrated in FIG. 3 includes a first wavelength converter 110, a second wavelength converter 120, a laser diode (LD) 132, a wavelength monitor 134, and an optical tap 136. The first wavelength converter 110 includes an optical power adjuster 112, a control circuit 114, and a first nonlinear medium 116. The second wavelength converter 120 includes a second nonlinear medium 122 and an optical selector (filter) 124.

The first wavelength converter 110 converts a wavelength $\lambda in$ of input signal light into an intermediate wavelength $\lambda m$ using the self-frequency shift effect, and outputs the resultant signal light. The wavelength shift amount that is a difference between the wavelength $\lambda in$ of the input signal light and the intermediate wavelength $\lambda m$ depends on optical power of the signal light input to the first nonlinear medium 116.

The optical power adjuster 112 adjusts the optical power of the input signal light, according to an instruction from the control circuit 114, such that the wavelength $\lambda in$ of the input signal light is converted into a desired intermediate wavelength $\lambda m$. The optical power adjuster 112 may directly output the input signal light to the first nonlinear medium 116 if the optical power adjuster 112 has not received an instruction from the control circuit 114. The optical power adjuster 112 may use an optical attenuator and an optical amplifier which operate to reduce and to increase optical power of signal light, respectively. An erbium-doped fiber amplifier (EDFA) or a semiconductor optical amplifier (SOA) may be used as the optical amplifier, while the optical amplifier is not limited to these devices. The optical power adjuster 112 outputs the power-adjusted signal light to the first nonlinear medium 116.

The control circuit 114 determines an adjustment amount of the optical power for the input signal light such that the wavelength $\lambda out$ of the output signal light is the desired wavelength. The control circuit 114 may include, for example, a table that stores data of the relationship between the optical power of the signal light input to the first nonlinear medium 116 and the wavelength shift amount. The control circuit 114 may also store information on the wavelength of the LD 132 (wavelength of pump light). The control circuit 114 is able to determine the adjustment amount of the optical power in accordance with the above-described table and information on the wavelength of the LD 132. In addition, the control circuit 114 obtains from the wavelength monitor 134 information on the wavelength λout of the output signal light. The control circuit 114 is able to detect a difference between the wavelength λout of the output signal light and a set wavelength (desired wavelength) in accordance with information from the wavelength monitor 134 and adjust the optical power so that the wavelength λout of the output signal matches the set wavelength. The control circuit 114 determines, for example, to reduce the adjustment amount of the optical power when the wavelength λout of the output signal light is shorter than the desired wavelength. The control circuit 114 indicates the determined adjustment amount of the optical power to the optical power adjuster 112. The control circuit 114 may receive information on the wavelength λout of the output signal light from, for example, an external device or the like.

The first nonlinear medium 116 converts the wavelength of the signal light received from the optical power adjuster 112 into the intermediate wavelength on the long wavelength side using the self-frequency shift effect. The wavelength shift amount (variation amount) depends on the optical power of the input signal light. As the optical power of the signal light input to the first nonlinear medium 116 increases, the wavelength shift amount of the signal light output from the first nonlinear medium 116 increases. The wavelength of the signal light input to the first nonlinear medium 116 shifts to the long wavelength side. The signal light of which the wavelength has been converted into the intermediate wavelength with the first nonlinear medium 116 is input to the second nonlinear medium 122 of the second wavelength converter 120.

The second wavelength converter 120 converts the intermediate wavelength λm of the signal light into a wavelength λout of the output signal light using the four-wave mixing (FWM) effect and outputs the resultant signal light.

In the second wavelength converter 120, the second nonlinear medium 122 receives the signal light of the intermediate wavelength λm from the first wavelength converter 110. The second nonlinear medium 122 also receives pump light of a wavelength λp from the LD 132. The wavelength λp of the pump light is set to a wavelength at which the FWM effect is efficiently produced. For example, the wavelength λp is set to match the zero dispersion value (zero-dispersion wavelength) of the second nonlinear medium 122.

Owing to the FWM effect in the second nonlinear medium 122, signal light of a new wavelength (λout) is generated. The wavelength λout is expressed as in the following equation. The signal light of the new wavelength becomes output signal light.

$$\frac{1}{\lambda_{out}} = \frac{2}{\lambda_p} - \frac{1}{\lambda_m}, \quad (2)$$

The intermediate wavelength λm of the signal light input to the second nonlinear medium 122 is settable to a certain wavelength on the long wavelength side with the optical power adjuster 112 when compared to the wavelength $\lambda_{in}$ of the input signal light. Thus, the wavelength conversion apparatus 100 is capable of controlling the wavelength of the light newly generated in the second nonlinear medium 122 (output signal light) to a desired value even when the wavelength λp of the pump light is a fixed value. That is, when the desired wavelength of the output signal light is λout, the control circuit 114 of the first wavelength converter 110 adjusts the optical power of the input signal light so as to make the intermediate wavelength λm match a value expressed in the following equation.

$$\lambda_m = \frac{\lambda_p \times \lambda_{out}}{2\lambda_{out} - \lambda_p}, \quad (3)$$

The intermediate wavelength λm of the signal light input to the second nonlinear medium 122 is converted to a certain desired wavelength on the long wavelength side with the optical power adjuster 112. Thus, the wavelength conversion apparatus 100 is capable of controlling the wavelength of the signal light newly generated in the second nonlinear medium 122 to a desired value even when the wavelength λp of the pump light is fixed.

Material of the second nonlinear medium 122 is appropriately selected in accordance with the wavelength band of the input signal light and the output signal light. For example, when the input signal light and the output signal light have the identical wavelength band, a nonlinear medium that exhibits a zero dispersion value (zero-dispersion wavelength) longer than that (wavelength) in the wavelength band is selected as the second nonlinear medium 122. The reason is as follows. Since the first wavelength converter 110 converts the wavelength λin of the input signal light into a wavelength on the long wavelength side, the second wavelength converter 120 is unable to convert that wavelength into a wavelength in a desired wavelength band if a nonlinear medium that exhibits a zero dispersion value (zero-dispersion wavelength) smaller than a wavelength in the wavelength band is selected as the second non-linear medium 122.

The optical selector 124 receives the signal light of the intermediate wavelength λm, the pump light of the wavelength λp, and the output signal light of the wavelength λout from the second nonlinear medium 122. The optical selector 124 extracts the output signal light and outputs the extracted signal light. The optical selector 124 may use, for example, an optical band-pass filter or an optical band rejection filter that are composed of a dielectric multilayer, or an optical filter that limits an optical band with an optical fiber bragg grating.

The output signal light having been output from the optical selector 124 is sent out toward a desired adjacent device or the like. In addition, part of the output signal light having been output from the optical selector 124 is extracted at the optical tap 136 and input to the wavelength monitor 134.

The wavelength monitor 134 detects the wavelength λout of the output signal light. In order to detect the wavelength, any appropriate method is usable. The wavelength monitor 134 sends detected wavelength information to the control circuit 114.

In wavelength conversion by the FWM effect, light generating efficiency of the newly generated light depends on states of polarization (for example, polarization directions) of the input signal light and the pump light. Accordingly, the wavelength conversion apparatus 100 may adjust the polarization directions of the signal light and the pump light so as to be in the same polarization direction by polarization controllers before the signal light and the pump light are input to the second nonlinear medium 122. By suitably adjusting states of polarization of the signal light and the pump light input to the second nonlinear medium 122, the wavelength conversion apparatus 100 efficiently performs wavelength conversion. The polarization controllers may be disposed between the first nonlinear medium 116 and the second nonlinear medium 122, and between the LD 132 and the second nonlinear medium 122.

Figure 4:
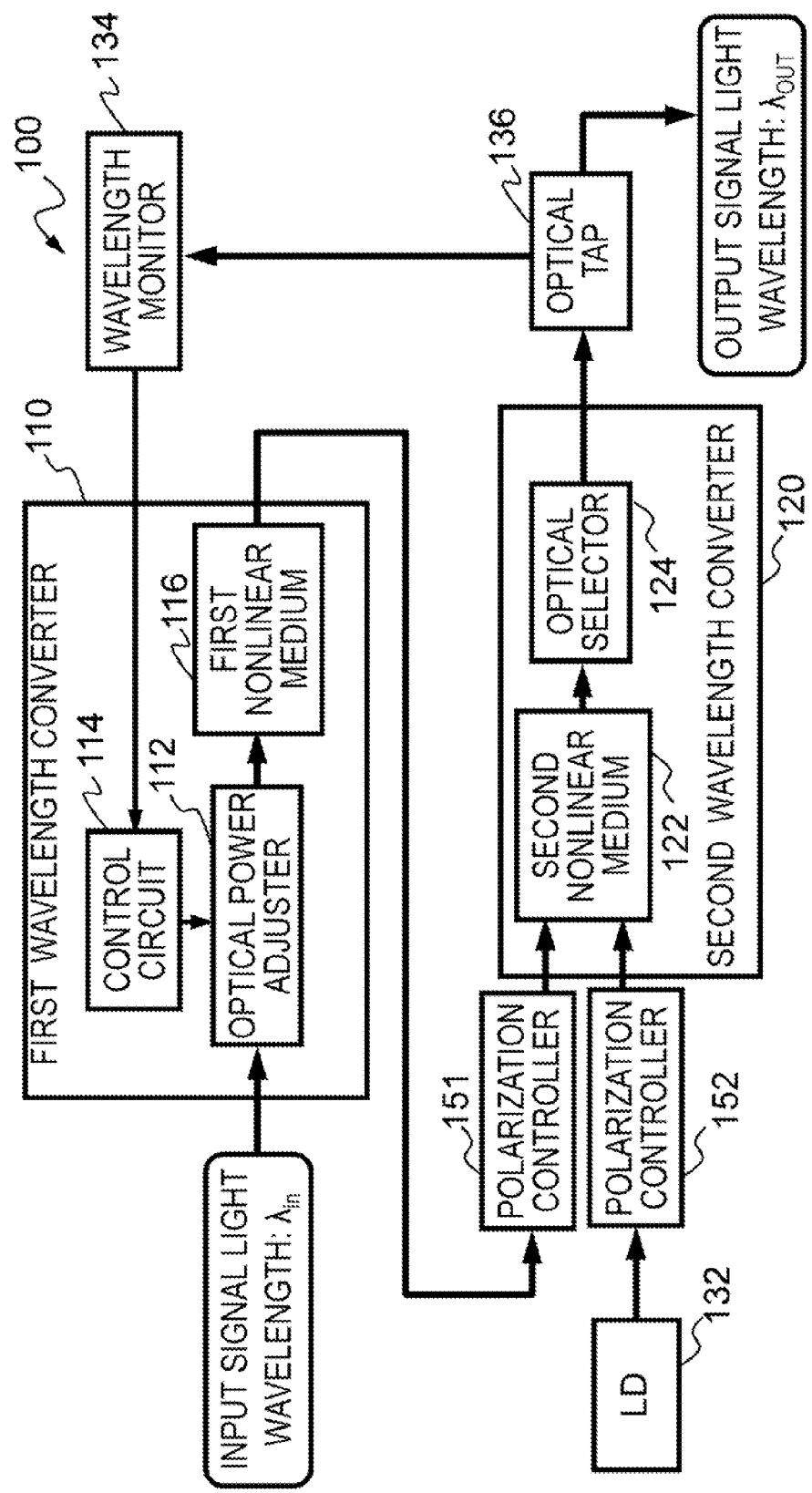
FIG. 4 is an example of a configuration of the wavelength conversion apparatus of the first embodiment.

FIG. 4 illustrates an example of the wavelength conversion apparatus in which polarization controllers 151 and 152 are disposed. In the example illustrated in FIG. 4, the polarization controller 151 is disposed between the first nonlinear medium 116 and the second nonlinear medium 122, and the polarization controller 152 is disposed between the LD 132 and the second nonlinear medium 122.

The polarization controllers 151 and 152 may each use an optical fiber to which stress is induced or a twisted optical fiber in order to control states of polarization. The controllers 151 and 152 may each use an optical fiber that is looped with the looped plane of the fiber being rotated for controlling the phase of light in order to control the states of polarization. The controllers 151 and 152 may each rotate a quarter-wave plate and a half-wave plate that respectively delay the phase of an electrical field in a specific direction of light by a quarter-wavelength and by a half-wavelength in order to control states of polarization. The controllers 151 and 152 may each use lithium niobate crystals in order to receive light and control the phase of an electrical field of the light in a specific direction in order to control states of polarization.

The first and second non-linear media 116 and 122 may each use, for example, a silica-based nonlinear fiber formed of silica glass, of which the nonlinear property is improved by reducing the effective core section area and increasing a concentration of dopant of the core. The media 116 and 122 may each use a photonic crystal fiber, which has a hollow core and of which the nonlinear property is improved by reducing the core section area. The media 116 and 122 may each use a nonlinear photonic crystal fiber formed of chalcogenide glass, of which the nonlinear property is improved by reducing the core section area. The media 116 and 122 may each use a band-gap fiber. In addition, the media 116 and 122 may each use a waveguide that has a high nonlinear refractive index such as a silicon waveguide, a chalcogenide glass waveguide, or a silicon organic hybrid waveguide. The media 116 and 122 are not limited to these fibers and waveguides.

The first wavelength converter 110 of the wavelength conversion apparatus 100 converts the wavelength $\lambda$in of the input signal light into the intermediate wavelength $\lambda$m of the signal light, which is input to the second wavelength converter 120. The second wavelength converter 120 of the wavelength conversion apparatus 100 converts the intermediate wavelength $\lambda$m of the signal light into the wavelength $\lambda$out of the output signal light using the FWM effect and outputs the resultant signal light. That is, the wavelength conversion apparatus 100 converts the wavelength $\lambda$in of the input signal light into the wavelength $\lambda$out of the output signal light and outputs the resultant signal light. The wavelength $\lambda$out of the output signal light is able to be set to a certain value independently of the wavelength $\lambda$in of the input signal light.

As illustrated in FIG. 4, the wavelength conversion apparatus 100 adjusts the wavelength shift amount by adjusting the input signal optical power with the control circuit 114 in accordance with information fed back from post-wavelength conversion wavelength information obtainable from output of the second wavelength converter 120. The wavelength conversion apparatus 100 further converts the intermediate wavelength of the signal light into a different wavelength using the FWM effect in the second nonlinear medium 122. Thus, the wavelength conversion apparatus 100 is capable of converting the wavelength of the input signal light from a certain wavelength into a desired wavelength. With the wavelength conversion apparatus 100, an optical electric field (for example, intensity and phase) of the input signal light is preserved, and wavelength conversion of the signal light independent of modulation formats is achievable.

The wavelength conversion apparatus 100 converts the wavelength of the input signal light into a certain wavelength using the self-frequency shift effect and the FWM effect, and outputs the resultant signal light. The wavelength conversion apparatus 100 converts the wavelength of the input signal light into a certain wavelength while keeping the signal light in the form of light and outputs the resultant signal light. That is, the wavelength conversion apparatus 100 is capable of converting the wavelength of the input signal light into a wavelength on either the long or short wavelength side. The wavelength conversion apparatus 100 is capable of converting a wavelength while keeping the signal light in the form of light without using electronic circuitry for the conversion. Thus, the wavelength conversion apparatus 100 is capable of converting a wavelength independently of modulation formats and may be capable of reducing power consumption.

The wavelength conversion apparatus 100 is capable of converting the wavelength of the signal light while keeping the signal light in the form of light without using electronic circuitry for the conversion. Thus, a high-speed wavelength conversion is achievable. The self-frequency shift effect and the FWM effect used in the wavelength conversion apparatus 100 are nonlinear effects that respond in the femtosecond order. Thus, the wavelength conversion apparatus 100 is capable of converting a wavelength in a response time of about femtoseconds.

Second Embodiment

Next, a second embodiment will be described. The second embodiment and the first embodiment have certain common features. Accordingly, the descriptions below are mainly dedicated to differences between the first and second embodiments and descriptions on common features will be omitted.

As is the case with the wavelength conversion apparatus of the first embodiment, a wavelength conversion apparatus of the second embodiment includes two wavelength converters that convert wavelengths using the self-frequency shift effect and the FWM effect. The wavelength conversion apparatus of the second embodiment converts a wavelength without wavelength conversion by the FWM effect when a wavelength $\lambda$in of input signal light is shorter than a desired wavelength $\lambda$out of output signal light.

Figure 5:
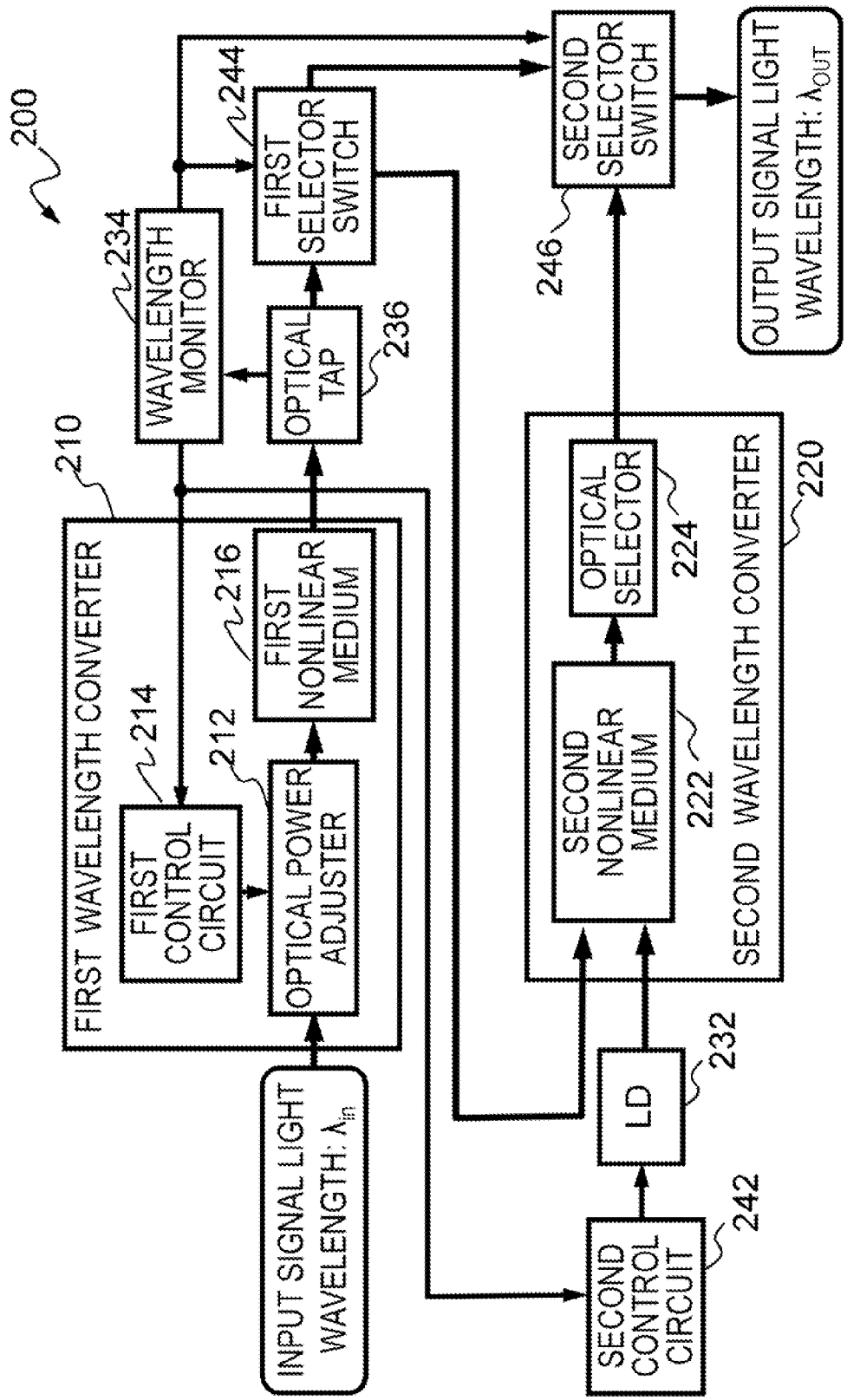
FIG. 5 is an example of a configuration of a wavelength conversion apparatus of a second embodiment.

FIG. 5 illustrates an example of a wavelength conversion apparatus of the second embodiment. A wavelength conversion apparatus 200 illustrated in FIG. 5 includes a first wavelength converter 210, a second wavelength converter 220, an LD 232, a wavelength monitor 234, and an optical tap 236. The first wavelength converter 210 includes an optical power adjuster 212, a first control circuit 214, and a first nonlinear medium 216. The second wavelength converter 220 includes a second nonlinear medium 222 and an optical selector (filter) 224. The wavelength conversion apparatus 200 also includes a second control circuit 242, a first selector switch 244, and a second selector switch 246.

The wavelength conversion apparatus 200 of the second embodiment skips wavelength conversion by the FWM effect with the second wavelength converter 220 when a wavelength $\lambda$in of input signal light is shorter than a desired wavelength $\lambda$out of output signal light. The wavelength conversion apparatus 200 performs wavelength conversion using the self-frequency shift effect and the FWM effect when the wavelength $\lambda$in of the input signal light is longer than the desired wavelength λout of the output signal light. Since the self-frequency shift effect is able to convert a wavelength into a wavelength on a long wavelength side, when the wavelength λin of the input signal light is shorter than the desired wavelength λout of the output light, the wavelength conversion apparatus 200 is capable of converting the wavelength into the desired wavelength without performing wavelength conversion using the FWM effect.

When the wavelength λin of the input signal light is longer than the desired wavelength λout of the output signal light, the first wavelength converter 210 operates similarly to the first wavelength converter 110 of the first embodiment except that output of the first nonlinear medium 216 is input to the optical tap 236. The first control circuit 214 detects a difference between the wavelength of the signal light that is output of the first nonlinear medium 216 and a set wavelength in accordance with information from the wavelength monitor 234 and adjusts the optical power so as to make the wavelength of the signal light that is the output from the first nonlinear medium 216 match the set intermediate wavelength λm.

When the wavelength λin of the input signal light is shorter than the desired wavelength λout of the output signal light, the first wavelength converter 210 converts the wavelength λin of the input signal light into the desired wavelength λout of the output signal light using the self-frequency shift effect and outputs the resultant signal light. The wavelength shift amount, which is the difference between the wavelength λin of the input signal light and the wavelength λout of the output signal light, depends on the optical power of the signal light input to the first nonlinear medium 216.

When the wavelength λin of the input signal light is shorter than the desired wavelength λout of the output signal light, the optical power adjuster 212 adjusts the optical power of the input signal light so as to convert the wavelength λin of the input signal light into the desired wavelength λout of the output signal light. The optical power adjuster 212 adjusts the optical power of the input signal light in accordance with an instruction from the first control circuit 214. The optical power adjuster 212 may directly output the input signal light to the first nonlinear medium 216 if there is not an instruction from the first control circuit 214. The optical power adjuster 212 may use an optical attenuator and an optical amplifier. The optical power adjuster 212 outputs the power-adjusted signal light to the first nonlinear medium 216.

When the wavelength λin of the input signal light is shorter than the desired wavelength λout of the output signal light, the first control circuit 214 determines the adjustment amount of the optical power for the input signal light in order to make the wavelength λout of the output signal light match the desired wavelength. The first control circuit 214, for example, includes data, such as a table, that represents the relationship between the optical power of the signal light input to the first nonlinear medium 216 and the wavelength shift amount and determines the adjustment amount of the optical power in accordance with the table. In addition, the first control circuit 214 obtains information on the wavelength of the signal light that is the output of the first nonlinear medium 216 from the wavelength monitor 234. The first control circuit 214 is capable of detecting a difference between the wavelength of the signal light that is the output of the first nonlinear medium 216 and the set wavelength in accordance with information from the wavelength monitor 234 and capable of adjusting the optical power so as to make the wavelength λout of the output signal light match the set wavelength. However, the difference between the wavelength of the signal light that is the output of the first nonlinear medium 216 and the set wavelength may not be detected. It is sufficient to make adjustment so as to make the wavelength of the signal light detected by the wavelength monitor 234 match the desired set wavelength.

The signal light output from the first nonlinear medium 216 is output toward the first selector switch 244. In addition, part of the signal light having been output from the first nonlinear medium 216 is extracted at the optical tap 236 and input to the wavelength monitor 234.

The wavelength monitor 234 detects the wavelength of the output signal light. The wavelength monitor 234 sends detected wavelength information to the first control circuit 214.

When the wavelength λin of the input signal light is longer than the desired wavelength λout of the output signal light, the wavelength monitor 234 instructs the first selector switch 244 to form connection between the optical tap 236 and the second wavelength converter 220. In addition, the wavelength monitor 234 instructs the second selector switch 246 to send out the signal light from the second wavelength converter 220 toward a desired adjacent device or the like.

When the wavelength λin of the input signal light is shorter than the desired wavelength λout of the output signal light, the wavelength monitor 234 instructs the first selector switch 244 to form connection between the optical tap 236 and the second selector switch 246. In addition, the wavelength monitor 234 instructs the second selector switch 246 to send out the signal light from the first selector switch 244 to an external device. The wavelength monitor 234 may also instruct the second control circuit 242 to stop supplying power to the LD 232. This makes it possible to save electricity by stopping supplying power to the LD 232 when the second wavelength converter 220 is not used.

When the wavelength λin of the input signal light is longer than the desired wavelength λout of the output signal light, the second wavelength converter 220 operates similarly to the second wavelength converter 120 of the first embodiment. The second control circuit 242 controls the LD 232 from which pump light is input to the second nonlinear medium 222. Then, the output signal light output from the optical selector 224 is sent out toward a desired adjacent device or the like.

Polarization controllers may be disposed between the first selector switch 244 and the second nonlinear medium 222, and between the LD 232 and the second nonlinear medium 222.

Figure 6:
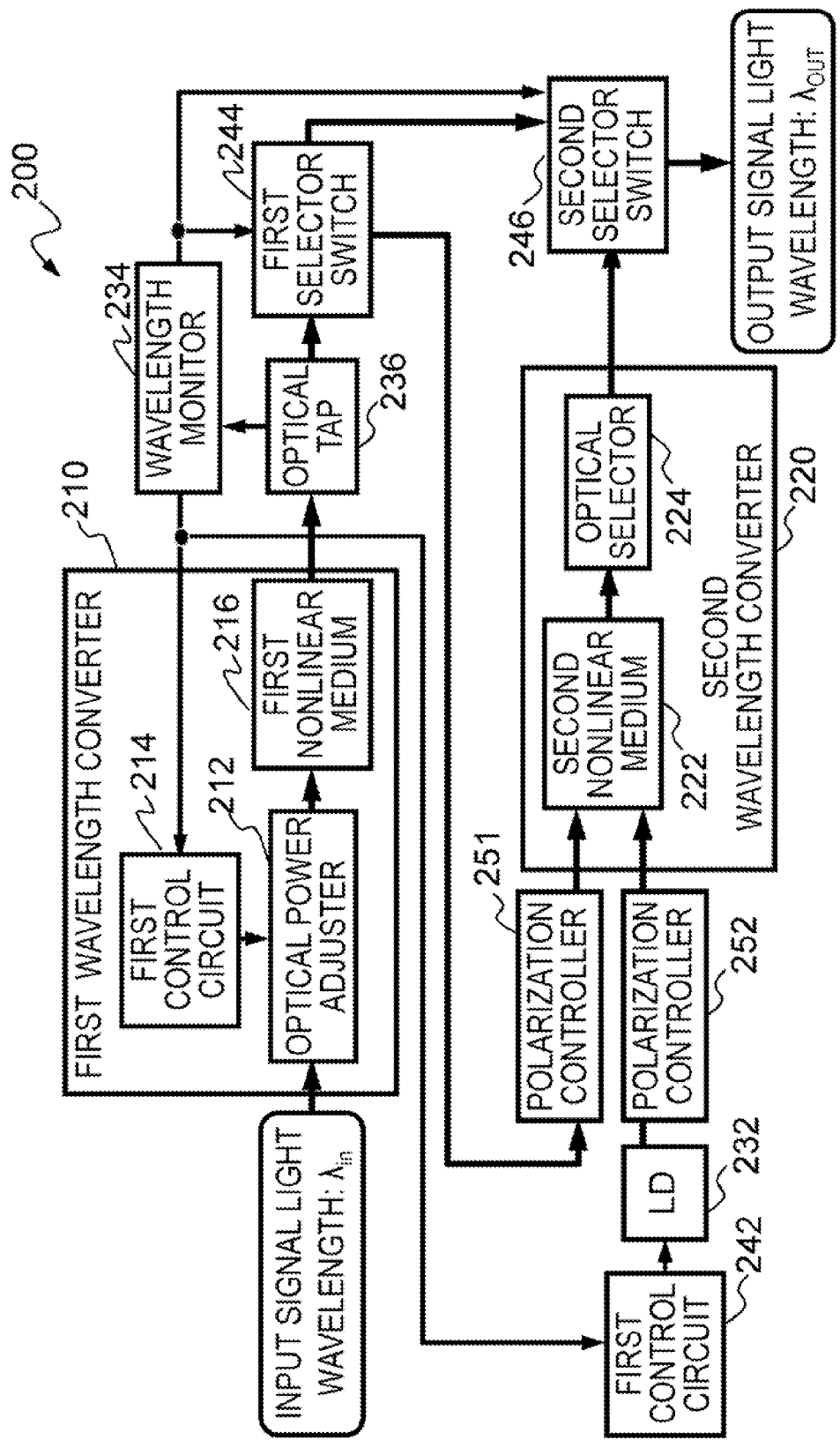
FIG. 6 is an example of a configuration of the wavelength conversion apparatus of the second embodiment.

FIG. 6 illustrates an example of the wavelength conversion apparatus in which the polarization controllers are disposed. In the example illustrated in FIG. 6, a polarization controller 251 is disposed between the first selector switch 244 and the second nonlinear medium 222, and a polarization controller 252 is disposed between the LD 232 and the second nonlinear medium 222.

When the wavelength λin of the input signal light is shorter than the desired wavelength λout of the output signal light, the signal light is not input to the second wavelength converter 220, and the second wavelength converter 220 is not used.

The wavelength conversion apparatus 200 converts a wavelength without using the second wavelength converter 220 that uses the FWM effect when the wavelength λin of the input signal light is shorter than the desired wavelength λout of the output signal light. The wavelength conversion apparatus 200 is capable of saving electricity by stopping supplying power to the LD 232 when the wavelength λin of the input signal light is shorter than the desired wavelength λout of the output signal light.

Third Embodiment

Next, a third embodiment will be described. The third embodiment and the first to second embodiments have certain common features. Accordingly, the descriptions below are mainly dedicated to differences between the third embodiment and the first to second embodiments and descriptions on common features will be omitted.

As is the cases with the wavelength conversion apparatuses of the first and second embodiments, a wavelength conversion apparatus of the third embodiment includes two wavelength converters that convert wavelengths using the self-frequency shift effect and the FWM effect. The wavelength conversion apparatus of the third embodiment performs wavelength conversion using the FWM effect before performing wavelength conversion by the self-frequency shift effect.

Figure 7:
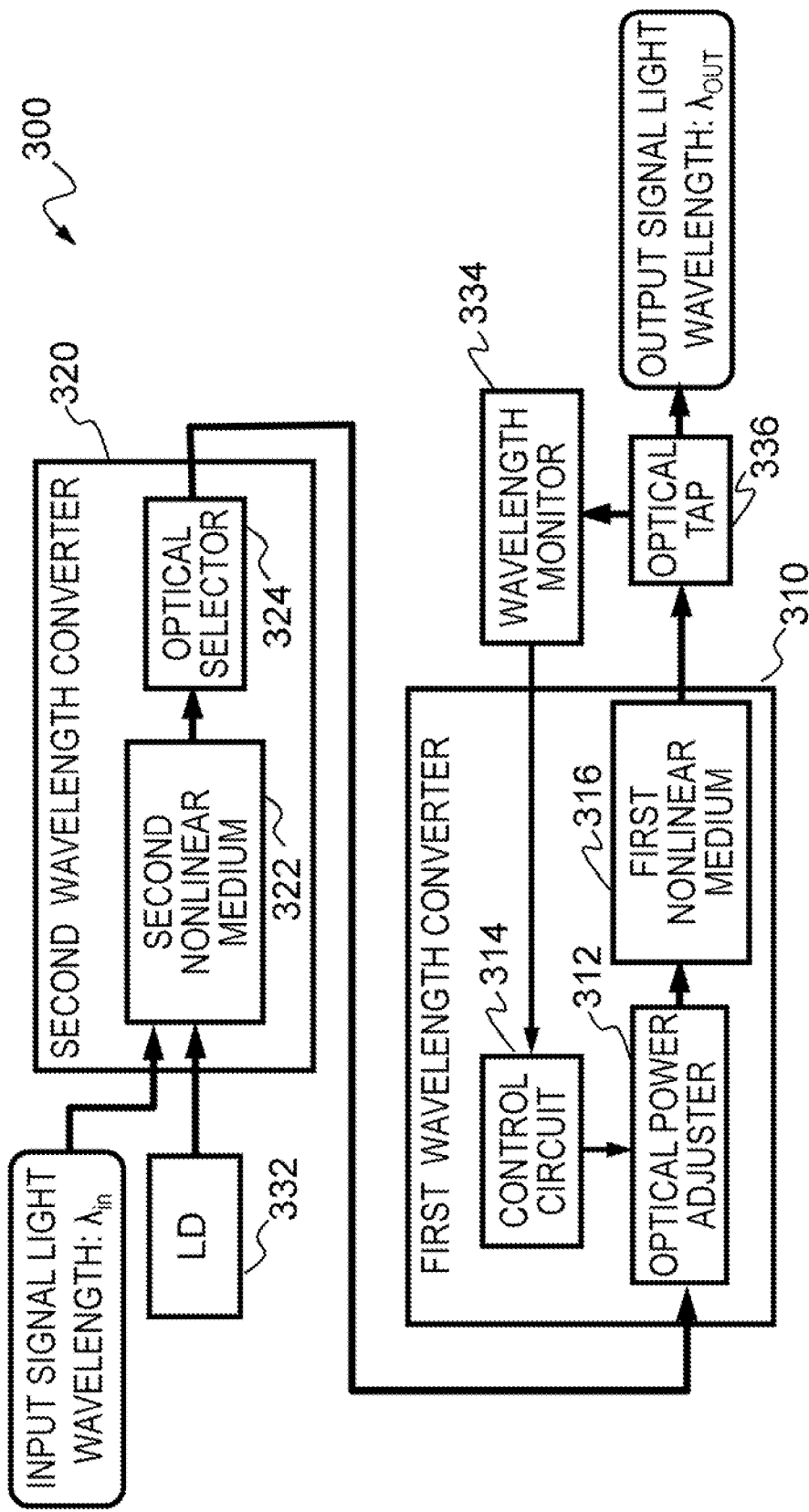
FIG. 7 is an example of an example of a configuration of a wavelength conversion apparatus of a third embodiment.

FIG. 7 illustrates an example of a wavelength conversion apparatus of the third embodiment. A wavelength conversion apparatus 300 illustrated in FIG. 7 includes a second wavelength converter 320, a first wavelength converter 310, an LD 332, a wavelength monitor 334, and an optical tap 336. The second wavelength converter 320 includes a second nonlinear medium 322 and an optical selector (filter) 324. The first wavelength converter 310 includes an optical power adjuster 312, a control circuit 314, and a first nonlinear medium 316.

The second wavelength converter 320 converts a wavelength $\lambda$in of input signal light into an intermediate wavelength $\lambda$m of signal light using the FWM effect and outputs the resultant signal light.

The input signal light of the wavelength $\lambda$in is input to the second nonlinear medium 322. Pump light of a wavelength $\lambda$p is input to the second nonlinear medium 322 from the LD 332. The wavelength $\lambda$p of the pump light is set to match the zero dispersion value (zero-dispersion wavelength) of the second nonlinear medium 322. In addition, the wavelength $\lambda$p of the pump light is set to a wavelength shorter than a wavelength in the wavelength band of the input signal light. That is, a nonlinear medium that exhibits a zero dispersion value (zero-dispersion wavelength) smaller than a wavelength in the wavelength band of the input signal light is selected as the second nonlinear medium 322.

The second wavelength converter 320 operates similarly to the second wavelength converter 120 of the first embodiment except that the output of the optical selector 324 is input to the first wavelength converter 310 as the signal light of the intermediate wavelength $\lambda$m.

The first wavelength converter 310 converts the intermediate wavelength $\lambda$m of the signal light into a wavelength $\lambda$out of output signal light using the self-frequency shift effect and outputs the resultant signal light.

The first wavelength converter 310 operates similarly to the first wavelength converter 210 of the second embodiment when the wavelength $\lambda$in of the input signal light is shorter than the desired wavelength $\lambda$out of the output signal light in the second embodiment.

The signal light output from the first nonlinear medium 316 is sent out toward a desired adjacent device or the like. In addition, part of the signal light having been output from the first nonlinear medium 316 is extracted at the optical tap 336 and input to the wavelength monitor 334. The wavelength monitor 334 detects the wavelength $\lambda$out of the output signal light. The wavelength monitor 334 sends detected wavelength information to the control circuit 314.

Before the input signal light and the pump light are input to the second wavelength converter 320, a state of polarization of each of the input signal light and the pump light may separately be adjusted using polarization controllers.

Figure 8:
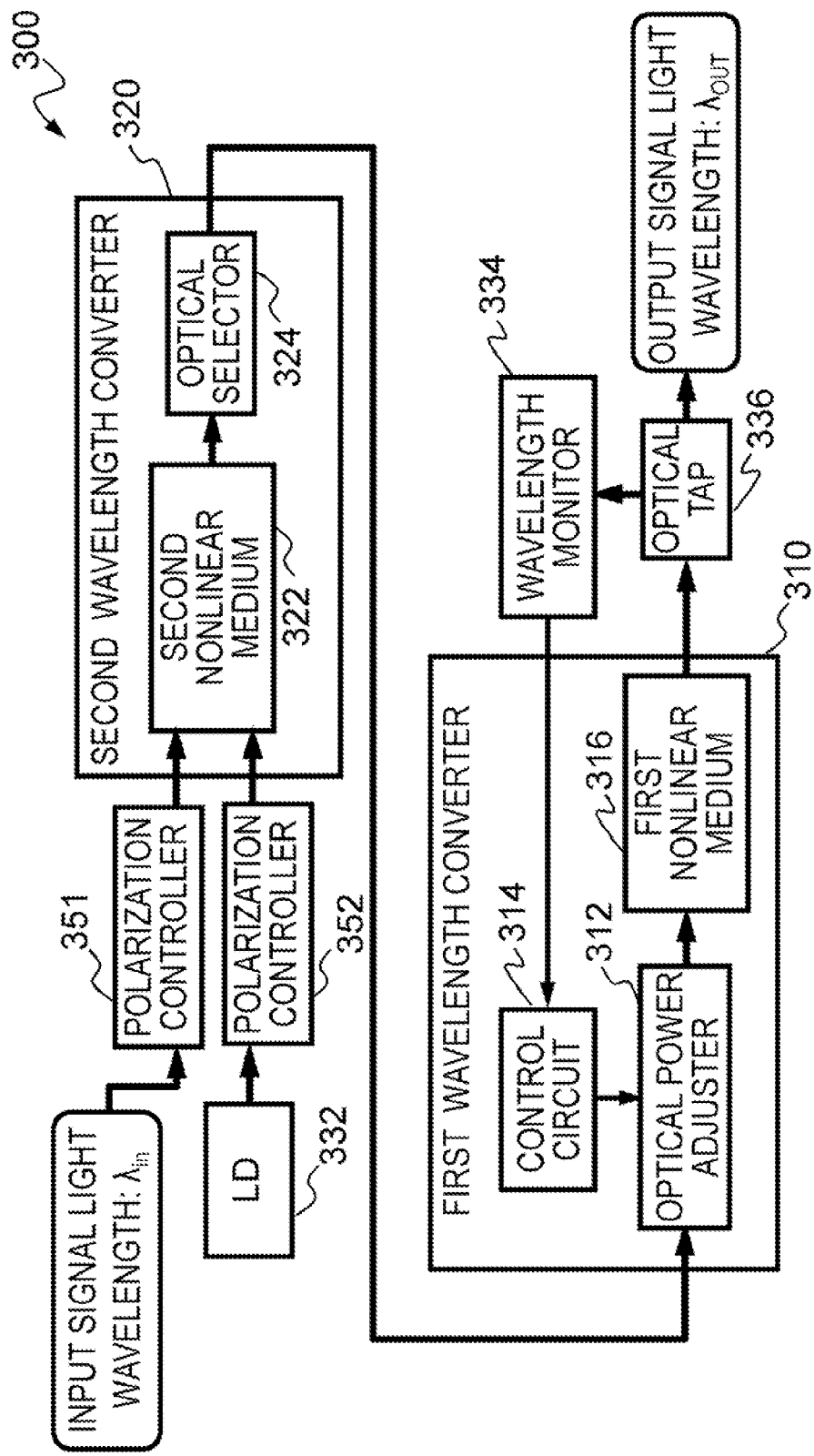
FIG. 8 is an example of a configuration of the wavelength conversion apparatus of the third embodiment.

FIG. 8 illustrates an example of the wavelength conversion apparatus in which the polarization controllers are disposed. In the example illustrated in FIG. 8, the input signal light and the pump light are respectively input to a polarization controller 351 and a polarization controller 352 before the input signal light and the pump light are input to the second wavelength converter 320.

The wavelength conversion apparatus 300 of the third embodiment converts the wavelength of the input signal light using the FWM effect, further converts the converted wavelength into the desired wavelength using the self-frequency shift effect, and outputs the resultant signal light.

The wavelength conversion apparatus 300 converts the wavelength of the input signal light into a certain wavelength using the FWM effect and the self-frequency shift effect and outputs the resultant signal light. The wavelength conversion apparatus 300 converts the wavelength of the input signal light into a certain wavelength while keeping the signal light in the form of light and outputs the resultant signal light. The wavelength conversion apparatus 300 converts a wavelength while keeping the signal light in the form of light without using electronic circuitry for the conversion. Thus, the wavelength conversion apparatus 300 is capable of converting a wavelength independently of modulation formats.

Fourth Embodiment

Next, a fourth embodiment will be described. The fourth embodiment and the first to third embodiments have certain common features. Accordingly, the descriptions below are mainly dedicated to differences between the fourth embodiment and the first to third embodiments and descriptions on common features will be omitted.

As is the cases with the wavelength conversion apparatuses of the first to third embodiments, a wavelength conversion apparatus of the fourth embodiment includes two wavelength converters that convert wavelengths using the self-frequency shift effect and the FWM effect. As is the case with the wavelength conversion apparatus of the third embodiment, the wavelength conversion apparatus of the fourth embodiment performs wavelength conversion using the FWM effect before performing wavelength conversion using the self-frequency shift effect. In the wavelength conversion apparatus of the fourth embodiment, a wavelength converter in which the FWM effect is produced does not include an optical selector (filter).

Figure 9:
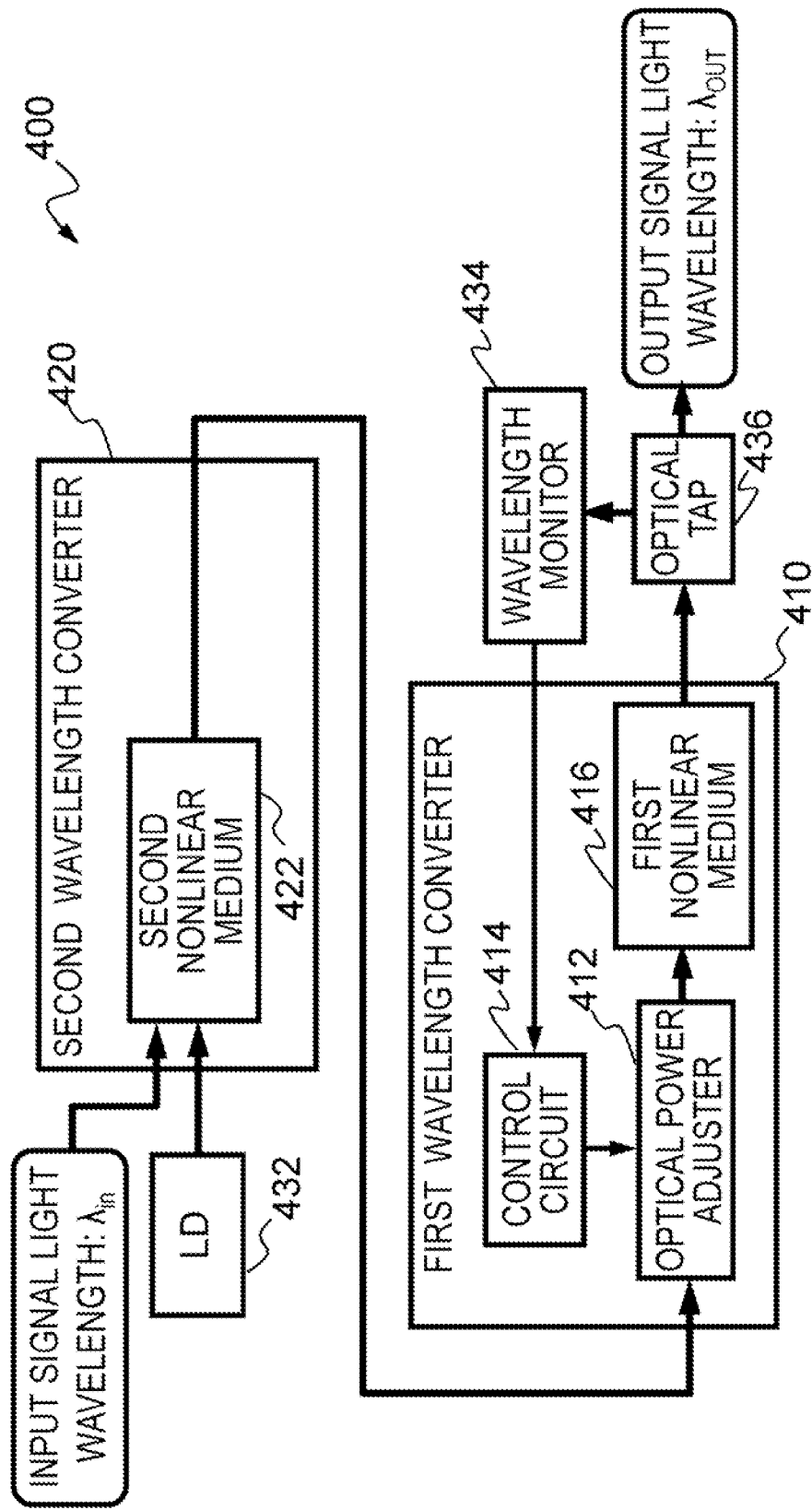
FIG. 9 is an example of a configuration of a wavelength conversion apparatus of a fourth embodiment.

FIG. 9 illustrates an example of a wavelength conversion apparatus of the fourth embodiment. A wavelength conversion apparatus 400 illustrated in FIG. 9 includes a second wavelength converter 420, a first wavelength converter 410, an LD 432, a wavelength monitor 434, and an optical tap 436. The second wavelength converter 420 includes a second nonlinear medium 422. The first wavelength converter 410 includes an optical power adjuster 412, a control circuit 414, and a first nonlinear medium 416.

The difference between the wavelength conversion apparatus 400 of the fourth embodiment and the wavelength conversion apparatus 300 of the third embodiment is that the second wavelength converter 420 of the wavelength conversion apparatus 400 does not include an optical selector.

Output of the second nonlinear medium 422 of the second wavelength converter 420 is input to the optical power adjuster 412. The output of the second nonlinear medium 422 of the second wavelength converter 420 includes input signal light of a wavelength $\lambda$in, pump light of a wavelength $\lambda$p, and wavelength-converted signal light of an intermediate wavelength $\lambda$m.

The optical power adjuster 412 of the first wavelength converter 410 does not amplify the pump light and the input signal light but amplifies the band of the signal light of the intermediate wavelength λm. As the optical power adjuster 412, an optical amplifier is used that features band limitation and amplifies the band of the signal light of the intermediate wavelength λm. By using, for example, an erbium-doped fiber amplifier (EDFA) as the optical amplifier, production of a gain in a specified band is achievable. By using such an optical amplifier, the pump light and the input signal light are eliminated without disposing an optical selector (filter) in the second wavelength converter 420.

Before the input signal light and the pump light are input to the second wavelength converter 420, a state of polarization of each of the input signal light and the pump light may separately be adjusted using polarization controllers.

Figure 10:
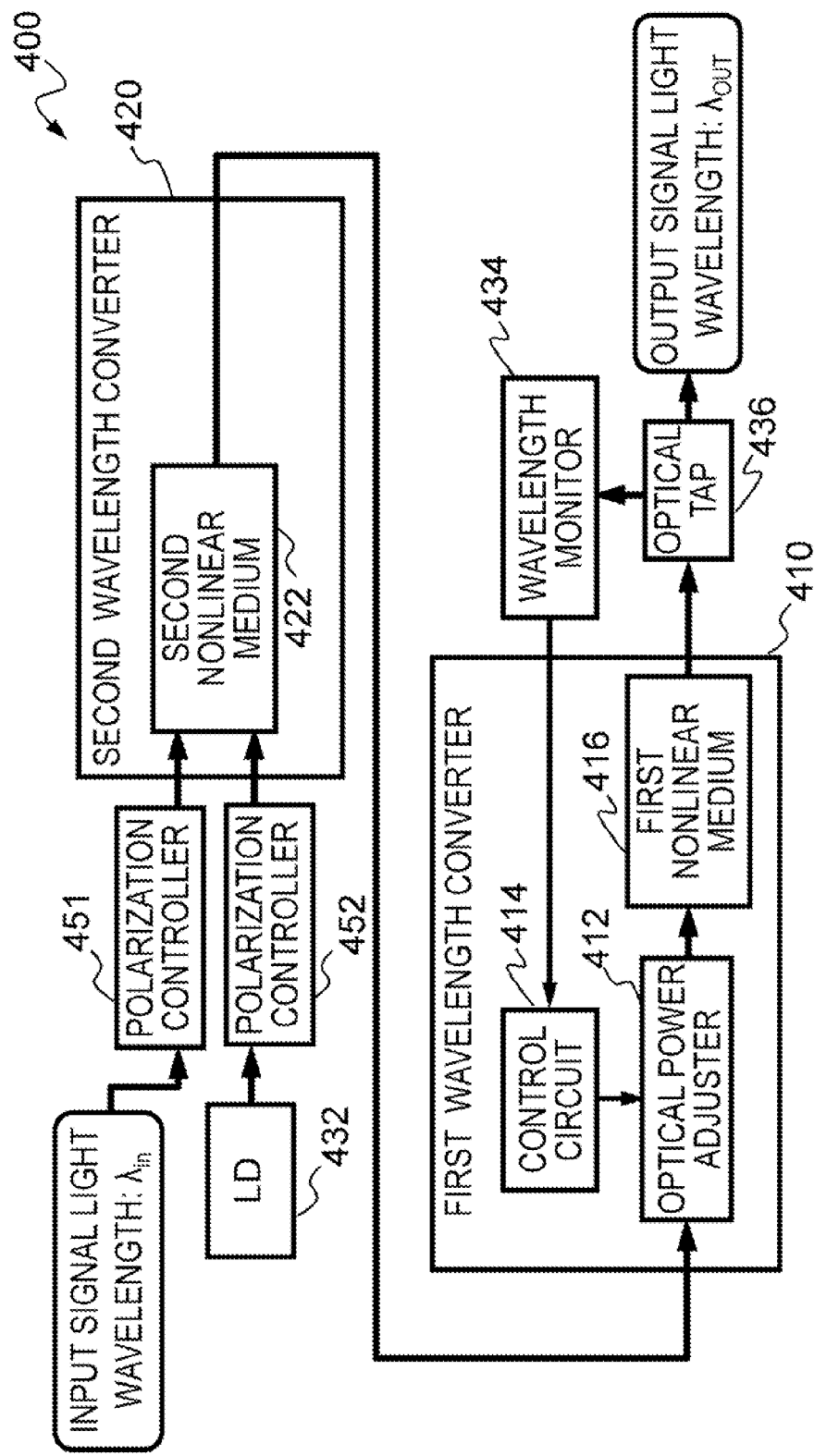
FIG. 10 is an example of a configuration of the wavelength conversion apparatus of the fourth embodiment.

FIG. 10 illustrates an example of the wavelength conversion apparatus in which the polarization controllers are disposed. In the example illustrated in FIG. 10, the input signal light and the pump light are respectively input to a polarization controller 451 and a polarization controller 452 before the input signal light and the pump light are input to the second wavelength converter 420.

The wavelength conversion apparatus 400 of the fourth embodiment outputs the input signal light, the pump light, and the signal light of the intermediate wavelength from the second wavelength converter 420. In the wavelength conversion apparatus 400, the optical power adjuster 412 of the first wavelength converter 410 amplifies the signal light of the intermediate wavelength but does not amplify the input signal light and the pump light.

The wavelength conversion apparatus 400 does not include an optical selector (filter) in the second wavelength converter 420. This allows the structure of the apparatus to be simple compared to the wavelength conversion apparatus of the third embodiment or the like.

Fifth Embodiment

Next, a fifth embodiment will be described. The fifth embodiment and the first to fourth embodiments have certain common features. Accordingly, the descriptions below are mainly dedicated to differences between the fifth embodiment and the first to fourth embodiments and descriptions on common features will be omitted.

Figure 11:
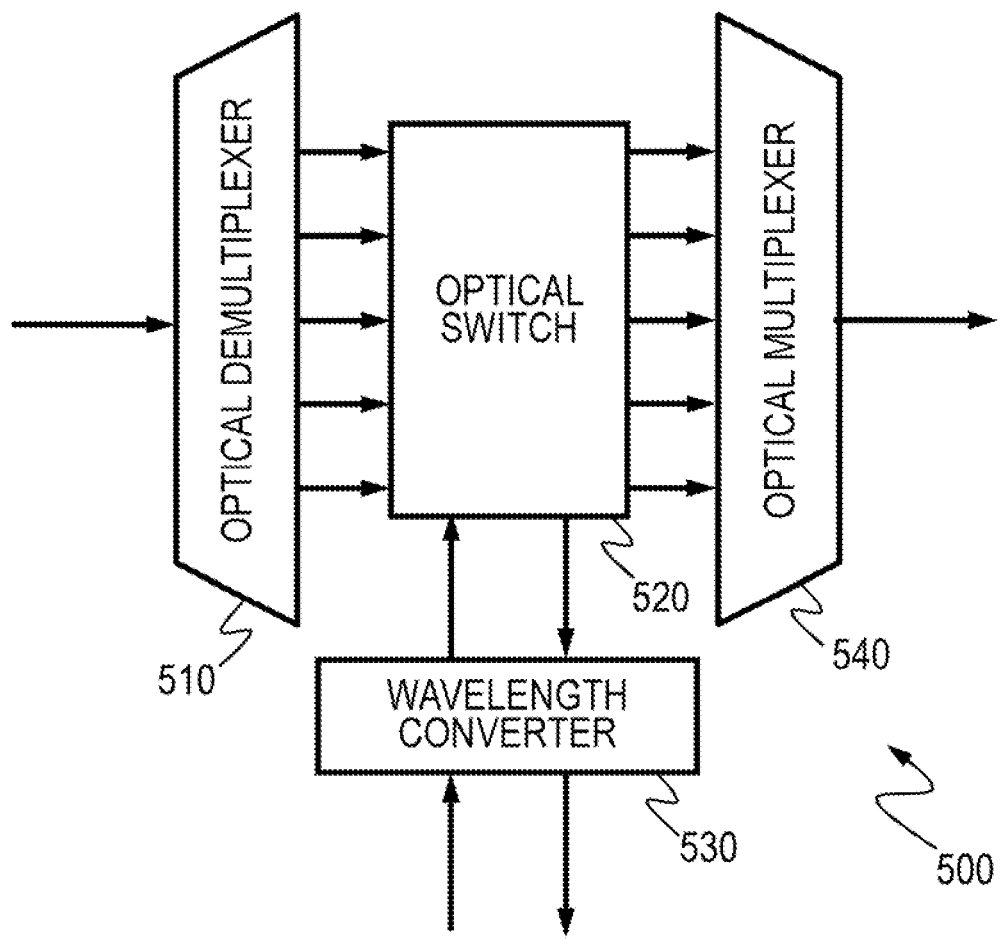
FIG. 11 is an example of a configuration of an optical add/drop multiplexer of a fifth embodiment.

FIG. 11 illustrates an example of an optical add/drop multiplexer of the fifth embodiment. An optical add/drop multiplexer 500 illustrated in FIG. 11 includes an optical demultiplexer 510, an optical switch 520, a wavelength converter 530, and an optical multiplexer 540. The wavelength converter 530 has the same configuration as the wavelength conversion apparatus in one of the first to fourth embodiments.

The optical add/drop multiplexer 500 selects a certain light signal from among input wavelength-multiplexed optical signals. The optical add/drop multiplexer 500 converts a wavelength of an external insertion optical signal input thereto into a selected optical signal wavelength. The optical add/drop multiplexer 500 multiplexes unselected optical signals and the wavelength-converted insertion optical signal and outputs the resultant signals.

The optical demultiplexer 510 branches an optical signal of a specified wavelength from wavelength-multiplexed optical signals. The external wavelength-multiplexed optical signals are input to the optical demultiplexer 510. The optical demultiplexer 510 outputs wavelength-demultiplexed optical signals to the optical switch 520.

The optical switch 520 selects a certain optical signal from among the optical signals having been wavelength-demultiplexed by the optical demultiplexer 510.

The wavelength converter 530 converts the wavelength of the insertion optical signal into the same wavelength as that of the optical signal selected by the optical switch 520. The wavelength converter 530 has the same configuration as the wavelength conversion apparatus in one of the first to fourth embodiments. The insertion optical signal is input to the wavelength converter 530 from the outside of the wavelength converter 530.

The optical multiplexer 540 multiplexes the optical signals not selected by the optical switch 520 and the insertion optical signal having been wavelength-converted by the wavelength converter 530. The optical multiplexer 540 outputs the multiplexed optical signals toward an external device.

In the optical add/drop multiplexer 500, the optical demultiplexer 510 branches the optical signal of the specified wavelength from among the input wavelength-multiplexed optical signals. In the optical add/drop multiplexer 500, the optical switch 520 selects a certain optical signal from among optical signals wavelength-demultiplexed by the optical demultiplexer 510. In the optical add/drop multiplexer 500, the wavelength converter 530 converts the wavelength of the insertion optical signal into the same wavelength as that of the optical signal selected by the optical switch 520. In the optical add/drop multiplexer 500, the optical multiplexer 540 multiplexes the optical signals not selected by the optical switch 520 and the insertion optical signal having been wavelength-converted by the wavelength converter 530. The optical add/drop multiplexer 500 outputs the multiplexed optical signals toward an external device.

The optical add/drop multiplexer 500 converts the wavelength of the insertion optical signal, multiplexes the wavelength-converted insertion optical signal and other optical signals, and outputs the resultant signals.

The optical add/drop multiplexer 500 converts the wavelength of the insertion optical signal light while keeping the insertion optical signal light in the form of light without using electronic circuitry for the conversion. Thus, a high-speed wavelength conversion is achievable. The optical add/drop multiplexer 500 is capable of converting a wavelength in a response time of about femtoseconds.

The optical add/drop multiplexer 500 is capable of converting the wavelength of the insertion optical signal from a certain wavelength into a desired wavelength. Thus, for example, intensity and phase of an optical electric field of the insertion optical signal is preserved, and wavelength conversion of the signal light is achieved independently from modulation formats.

Figure 12A:
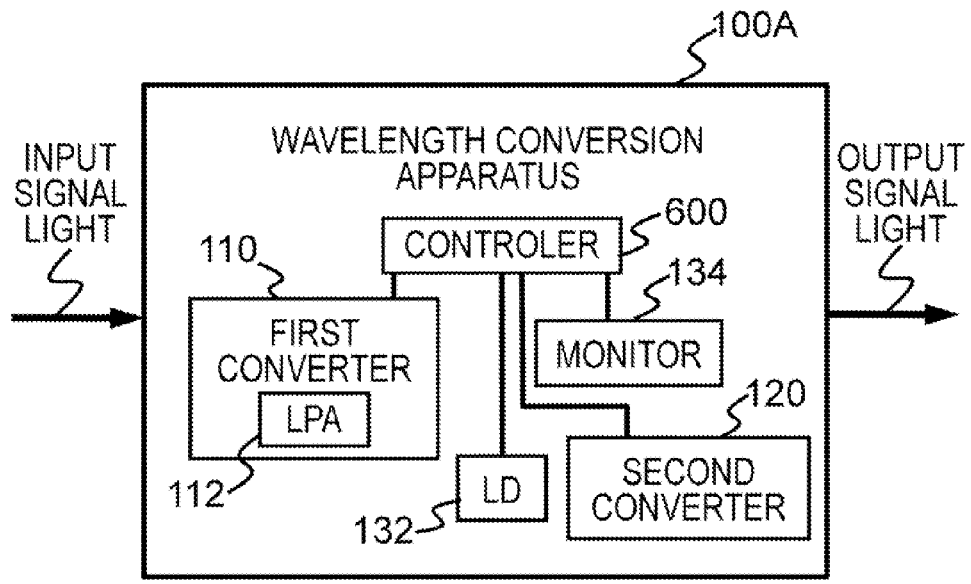
FIGS. 12A and 12B are examples of configurations for controlling each wavelength conversion apparatus.
Figure 12B:
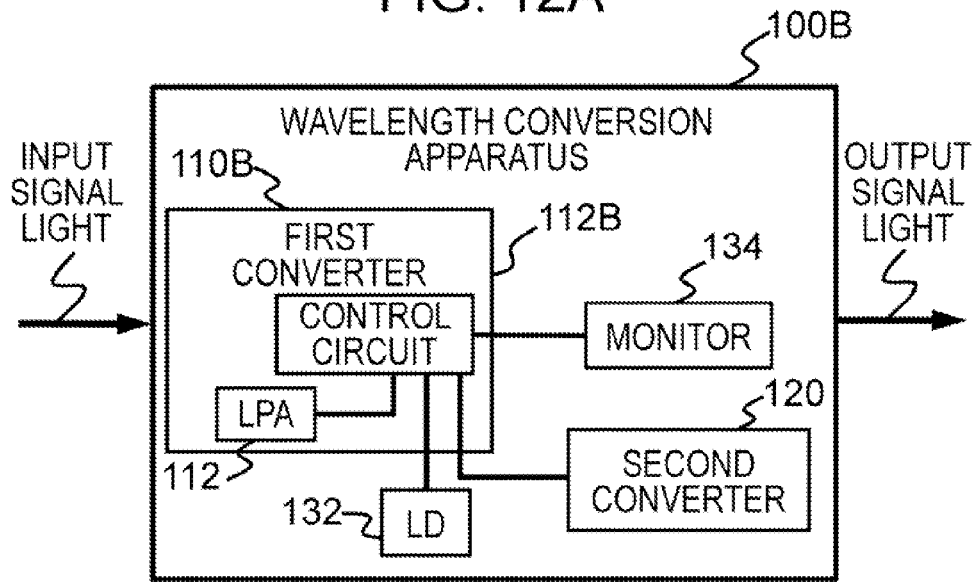

FIGS. 12A to 14 illustrate the operation flows as the sixth embodiments. The each operation flow may be performed with a controller 600 provided in the wavelength conversion apparatus 100A illustrated in FIG. 12A or a control circuit 112B of the first converter 110B provided in the wavelength conversion apparatus 100B illustrated in FIG. 12B, where the apparatus 100A and 100B may be similar to anyone of the apparatus 100, 200, 300, 400, or 530 which has been described above. The controller 600 or the control circuit 112B may preferably include a processor, such as a microprocessor or a field programmable gate array, and a memory device storing various data and a program or instruction set for performing the operation flow. FIGS. 12A and 12B illustrate the converter 100A and 100B, respectively, as a wavelength conversion apparatus, in which the elements having same references perform in the same manner described above.

The controller 600 and the control circuit 112B may control via a bus line or directly coupled line each of the elements such as the monitor 134 or the like.

Figure 13:
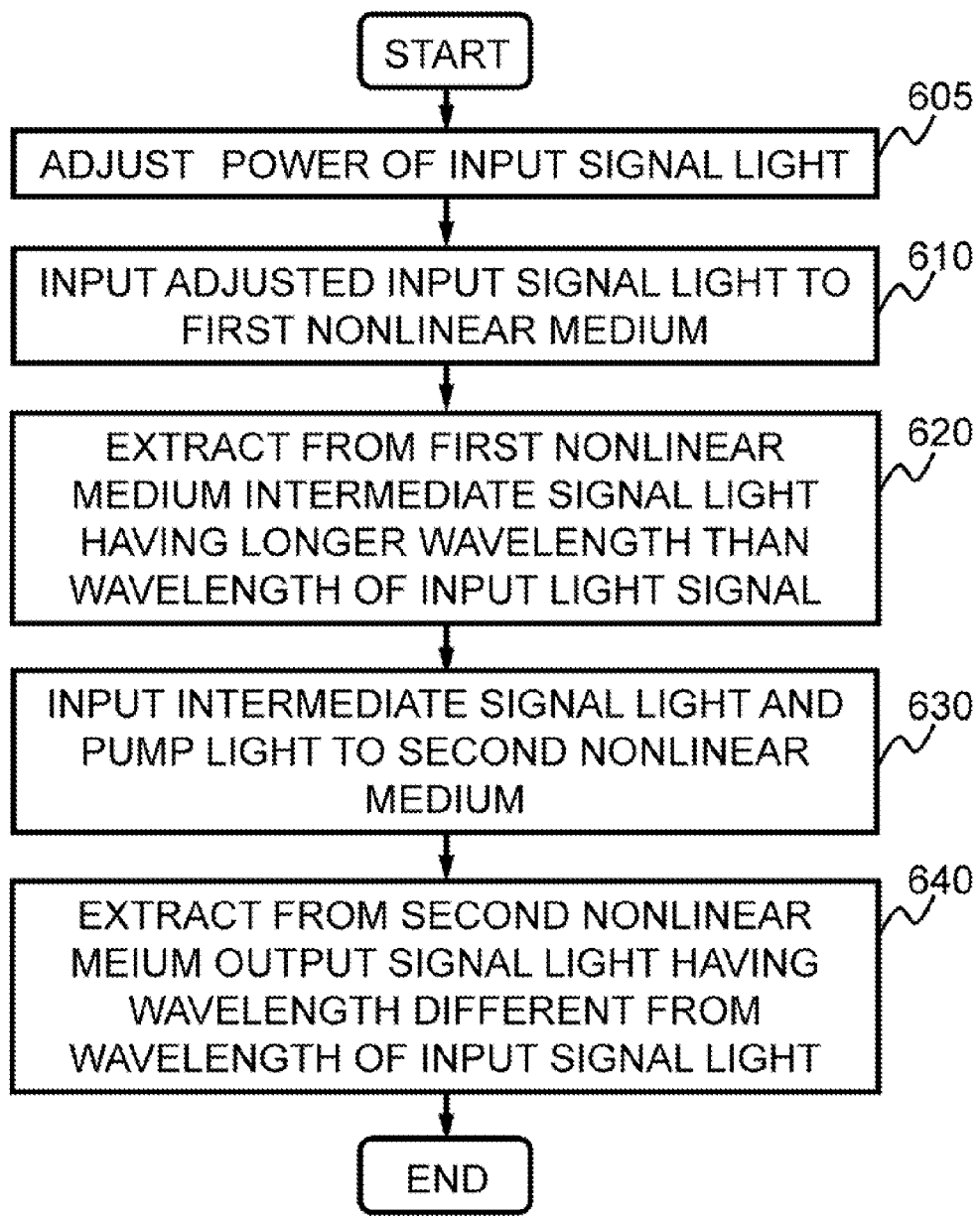
FIGS. 13 and 14 are examples of each operation flow performed by a wavelength conversion apparatus

For brief explanation, the operation flow will be described with reference to FIGS. 3 and 12A, while the operation flow illustrated in FIG. 13 is suitable for the wavelength conversion apparatus 100 or 200 illustrated in FIGS. 3 to 6.

In Operation 605, the optical power adjuster 112 adjusts the power of the input signal light entered into the first wavelength converter 110 (Operation 605). Then, the power adjusted input signal is input to the first nonlinear medium, such as the first nonlinear medium 116 in FIG. 3, provided in the first wavelength converter 110 (Operation 610). The signal light of which the wavelength is converted in the first nonlinear medium is output from the first wavelength converter 110 (Operation 620). The signal light is then input to the second nonlinear medium, such as the second nonlinear medium 122 illustrated in FIG. 3, provided in the second wavelength converter 120 together with the pump light from the LD 132 (Operation 630). Owning to the four waves mixing effect in the second nonlinear medium, signal light of a new wavelength is extracted among the light output from the second nonlinear medium (Operation 640).

Figure 14:
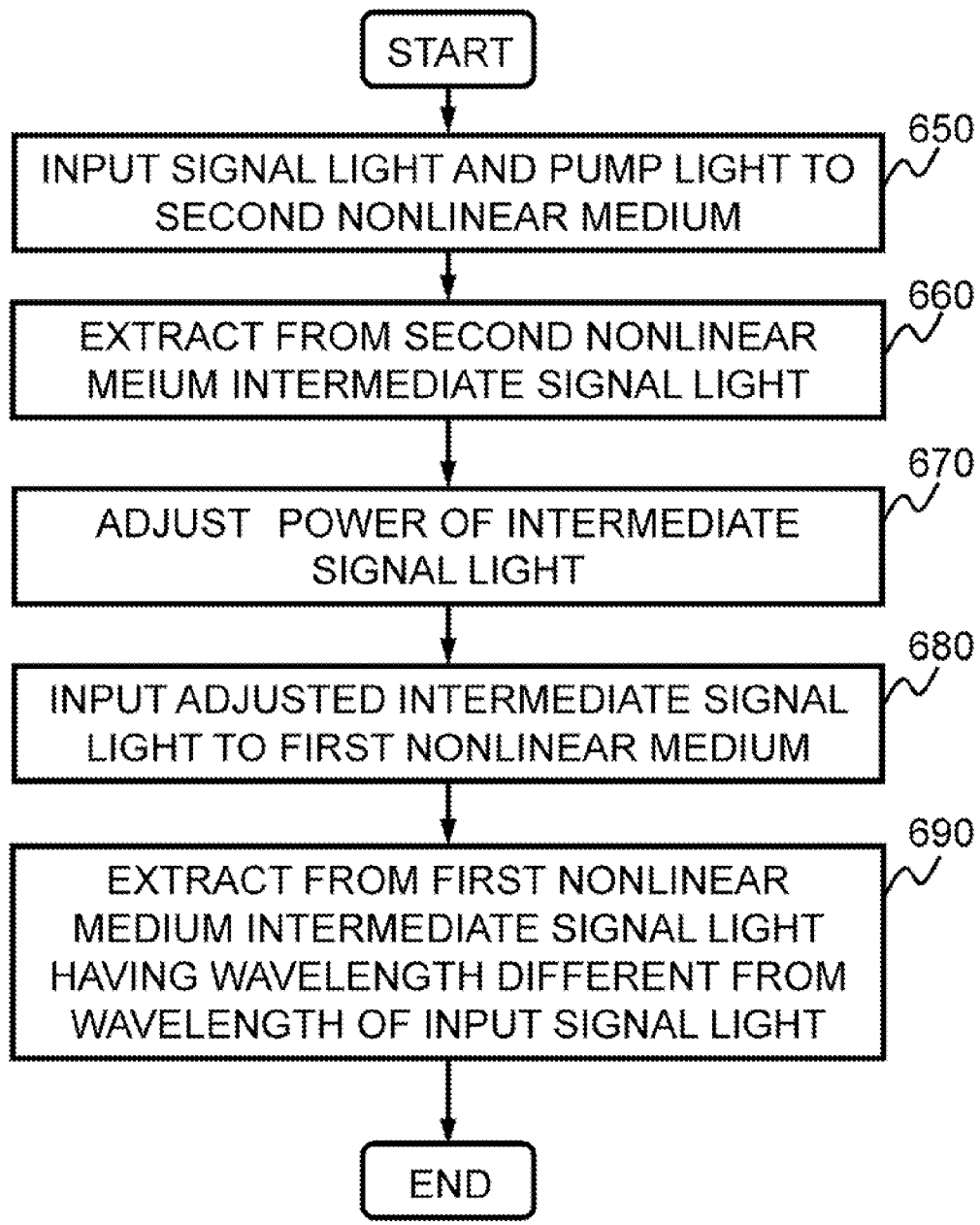

FIG. 14 illustrates an example of the operation flow according to the wavelength conversion apparatus such as the apparatus 300 or 400 in which signal light is processed in the second wavelength converter 320 or 420 before processed in the first wavelength converter 310 or 410 as illustrated in FIGS. 7 to 10. For brief explanation, the operation flow will be described with reference to FIG. 7. Pump light output from the laser light 332 and signal light are input into the second nonlinear medium 322 in the second wavelength converter 320 (Operation 650). The intermediate signal light generated in the second nonlinear medium 322 is extracted or optically selected (Operation 660). Then, power of the intermediate signal light or extracted signal light is adjusted before input to the first nonlinear medium 316 provided in the first wavelength converter 310 (Operations 670 and 680). Owing to the self-frequency shift effect of the first nonlinear medium 316, newly generated light having a wavelength different from the input signal light is output or extracted from the first nonlinear medium 316 (Operation 690).

The wavelength of the output signal light from the second wavelength converter 120 in FIG. 3 or the converter 310 in FIG. 7 is preferably monitored to adjust the power of the signal light input to the first nonlinear medium 116 or 316.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wavelength conversion apparatus, comprising:
   a first nonlinear medium that receives a first input light and outputs a first output light having a wavelength which is shifted by Raman effect and is longer than that of the first input light, the shifted wavelength being dependent on optical power of the first input light;
   a second nonlinear medium that receives a second input light and a light output by a light source and outputs a second output light having a wavelength dependent on wavelengths of the second input light and the light;
   a wavelength monitor that monitors a wavelength of an output light; and
   an optical power adjuster that adjusts the optical power of the first input light based on the wavelength of the output light monitored by the wavelength monitor,
   wherein the first output light is input as the second input light to the second nonlinear medium, and the output light is output as the second output light output from the second nonlinear medium and is partially provided to the wavelength monitor, or
   wherein the second output light is input as the first input light to the first nonlinear medium, and the output light is output as the first output light output from the first nonlinear medium and is partially provided to the wavelength monitor.

2. The apparatus according to claim 1, further comprising:
   a power controller that controls power supplied to the light source,
   wherein, in the case of the wavelength of the first input light is shorter than a desired wavelength of the output light, the power controller controls to stop supplying the power to the light source, and
   the optical power adjuster adjusts the optical power of the input light in response to the wavelength of the output light so that the wavelength of the output light has the desired wavelength.

3. The apparatus according to claim 1, wherein the wavelength of the first input light is shifted to a long wavelength side, by a self-frequency shift effect.

4. The apparatus according to claim 1, wherein the light source outputs, to the second nonlinear medium, the light having a zero dispersion wavelength inherent to the second nonlinear medium.

5. The apparatus according to claim 1, further comprising:
   a polarization controller that controls polarization directions of the second input light and the light so as to be in a same polarization direction.

6. The apparatus according to claim 1, wherein the optical power adjuster is an optical fiber amplifier.

7. The apparatus according to claim 1, wherein the optical filter is an optical band-pass filter having a dielectric multi-layer.

8. The apparatus according to claim 1, wherein the optical power adjuster is an optical fiber amplifier which amplifies light in a range of wavelength of the second output light from the second nonlinear medium.

9. A method, comprising:
   converting a first input light to a first output light having a first wavelength which is shifted by Raman effect and is longer than wavelength of the input light through a first nonlinear medium, the first shifted wavelength of the first output light being dependent on power of the first input light, the power of the first input light being adjusted based on a wavelength of an output light monitored by a wavelength monitor; and
   converting a second input light to a second output light having a second wavelength through a second nonlinear medium, the second wavelength being dependent on wavelengths of the second input light and a light from a light source,
   wherein the first output light is input as the second input light to the second nonlinear medium, and the output light is output as the second output light output from the second nonlinear medium and is partially provided to the wavelength monitor, or
   wherein the second output light is input as the first input light to the first nonlinear medium, and the output light is output as the first output light output from the first nonlinear medium and is partially provided to the wavelength monitor.

10. The method according to claim 9, further comprising:
filtering out the first output light and the light, wherein the power of the first input light is adjusted so that a wavelength of the output light comes near desired wavelength.

11. The method according to claim 9, further comprising:
controlling a power supplied to the light source,
wherein, in the case of the wavelength of the first input light is shorter than a desired wavelength of the output light, the first nonlinear medium receives as the first input light of which power is adjusted and outputs the first output light as the output light,
the power to the light source is controlled to be stopped, and
the power of the first input light is adjusted in response to a wavelength of the output light so that the wavelength of the output light comes near a desired wavelength.

12. The method according to claim 9, wherein the converting for the first input light to the first output light is performed by the use of an effect of a self frequency shift inherent to the first nonlinear medium.

* * * * *